(No Model.)

J. E. DAVIS.
POST HOLE DIGGER.

No. 318,359. Patented May 19, 1885.

WITNESSES:
Harry Frease
J. S. Ballard

INVENTOR
James E. Davis
BY
ATTORNEY

UNITED STATES PATENT OFFICE.

JAMES E. DAVIS, OF PALMYRA, ASSIGNOR OF ONE-HALF TO THOMAS C. SNYDER, OF CANTON, OHIO.

POST-HOLE DIGGER.

SPECIFICATION forming part of Letters Patent No. 318,359, dated May 19, 1885.

Application filed October 2, 1884. (No model.)

*To all whom it may concern:*

Be it known that I, JAMES E. DAVIS, a citizen of the United States, residing at Palmyra, in the county of Portage and State of Ohio, have invented certain new and useful Improvements in Post-Hole Diggers; and I do hereby declare that the following is a full, clear, and exact description of the same, reference being had to the annexed drawings, making a part of this specification, and to the letters and figures of reference marked thereon, in which—

Figure 1:
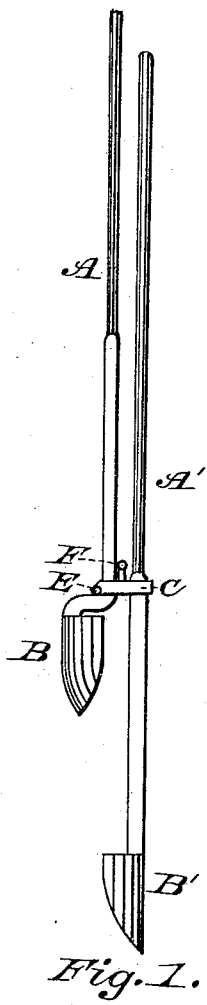
Figure 2:
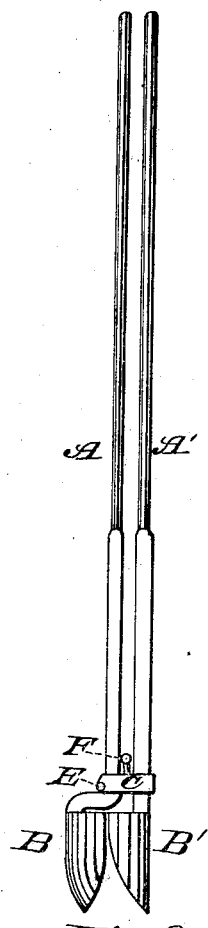
Figure 3:
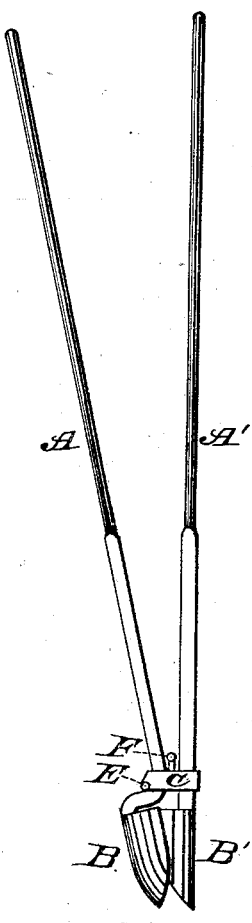
Figure 4:
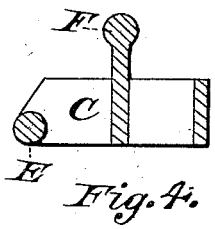

Figure 1 is a side view showing one of the handles and spade raised. Fig. 2 is a side view showing the parts in proper position to be forced into the ground. Fig. 3 is a side view showing the parts in proper position to raise a body of earth, and Fig. 4 is a detached longitudinal section of sliding clamp and its parts.

The present invention has relation to that class of post-hole diggers in which two spades or scoops are used; and its nature consists in providing two handles or arms, and in providing a sliding hinged clamp, and in the several parts and combinations hereinafter described, and pointed out in the claims.

Similar letters of reference indicate corresponding parts in all the figures of the drawings.

In the accompanying drawings, A A' represent the handles or arms, and are of the form shown in the drawings. To the bottom or lower ends of said handles or arms are attached, in the ordinary manner, the spades or scoops B B', said spades or scoops being substantially of the form shown in the drawings.

The sliding clamp C is substantially of the form shown, and is preferably made of malleable iron. One end of this sliding clamp is formed square, as seen in Fig. 4. The opposite end is provided with the round rod or bar E, which is for the purpose of forming a fulcrum for the handle or arm A, and at the same time permitting said handle or arm A to operate freely. The sliding clamp C is also provided with the arm F, which is located in said clamp, as seen in Fig. 4, and may be formed with the sliding clamp C; or it may be made separate and attached by clamping bolts or rivets. The top or upper portion of the arm F is provided with a head, as shown in the drawings, and is for the purpose of holding the handles or arms A A' the desired distance apart, and at the same time forming a pry for said handles or arms.

In use the digger may be placed in the position shown in Fig. 1, the spade B' being forced into the ground, when the spade B is also forced downward, and the earth or other material being raised by bringing the parts in the position shown in Fig. 3 and removing the digger. In soft ground the digger may be forced downward in the position shown in Fig. 2.

It will be seen that by my peculiar arrangement I am enabled to separate the handles or arms A A' by removing the sliding clamp C, when one of the handles or arms may be used as a spud in case the ground is hard or stones are found. To prevent the sliding clamp C from going too far down, the bottom or lower portion of the handle A is formed as shown in the drawings, and at the same time permitting the spade or scoop B to be thrown slightly under the spade or scoop B', as seen in Fig. 3.

Having now fully described my invention, what I claim as new, and desire to secure by Letters Patent, is—

1. In a post-hole digger, the sliding clamp C, provided with the bar E and the headed arm F, all arranged substantially as shown and described, and for the purpose specified.

2. In a post-hole digger, the separable handles or arms A A', provided with the spades B B', in combination with the sliding clamp C, provided with the headed arm F, substantially as and for the purpose specified.

In testimony that I claim the above I have hereunto subscribed my name in the presence of two witnesses.

JAMES E. DAVIS.

Witnesses:
FRED W. BOND,
O. O. SHIVELY.